(12) United States Patent
Komiyama

(10) Patent No.: US 12,293,026 B2
(45) Date of Patent: May 6, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mai Komiyama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 108 days.

(21) Appl. No.: 18/295,751

(22) Filed: Apr. 4, 2023

(65) Prior Publication Data
US 2023/0341947 A1    Oct. 26, 2023

(30) Foreign Application Priority Data
Apr. 21, 2022  (JP) .................... 2022-069848

(51) Int. Cl.
| | |
|---|---|
| G06F 3/01 | (2006.01) |
| G06V 40/10 | (2022.01) |
| G06V 40/20 | (2022.01) |
| H04N 23/611 | (2023.01) |
| H04N 23/69 | (2023.01) |
| H04N 23/695 | (2023.01) |

(52) U.S. Cl.
CPC ............. *G06F 3/017* (2013.01); *G06V 40/10* (2022.01); *G06V 40/28* (2022.01); *H04N 23/611* (2023.01); *H04N 23/69* (2023.01); *H04N 23/695* (2023.01)

(58) Field of Classification Search
CPC ........ G06F 3/017; G06V 40/10; G06V 40/28; G06V 20/52; G06V 40/20; G06V 40/161; H04N 23/611; H04N 23/69; H04N 23/695; H04N 23/661; H04N 23/90; H04N 23/60
See application file for complete search history.

(56) References Cited

U.S. PATENT DOCUMENTS

| | | | | |
|---|---|---|---|---|
| 11,245,840 B2* | 2/2022 | Kelly | ................... | H04N 23/611 |
| 11,467,673 B2* | 10/2022 | Sandhan | ................ | H01Q 1/243 |
| 2014/0101578 A1* | 4/2014 | Kwak | ..................... | G06F 3/017 |
| | | | | 715/761 |
| 2014/0184854 A1* | 7/2014 | Musatenko | ............ | H04N 23/69 |
| | | | | 348/240.2 |
| 2015/0205363 A1* | 7/2015 | Wu | ........................ | H04N 23/61 |
| | | | | 345/156 |

(Continued)

FOREIGN PATENT DOCUMENTS

JP    2020188297 A    11/2020

*Primary Examiner* — Timothy J Henn
(74) *Attorney, Agent, or Firm* — Canon U.S.A., Inc., IP Division

(57) ABSTRACT

An information processing apparatus includes a detection unit configured to detect, based on images captured by a first imaging apparatus, a gesture performed by a subject, the first imaging apparatus being among a plurality of imaging apparatuses that includes a second imaging apparatus different from the first imaging apparatus, the second imaging apparatus being configured to be controlled based on the gesture performed by the subject, an acquisition unit configured to acquire control information for controlling the second imaging apparatus, the control information being associated with the gesture detected by the detection unit, and a control unit configured to control the second imaging apparatus based on the control information acquired by the acquisition unit.

12 Claims, 9 Drawing Sheets

(56) References Cited

U.S. PATENT DOCUMENTS

| | | | | |
|---|---|---|---|---|
| 2015/0288866 A1* | 10/2015 | Barsoum | ................ | H04N 23/63 |
| | | | | 348/207.1 |
| 2016/0156838 A1* | 6/2016 | Cheng | .................... | H04N 23/90 |
| | | | | 348/222.1 |
| 2016/0337598 A1* | 11/2016 | Zaitsev | .................. | H04N 23/61 |
| 2022/0345631 A1* | 10/2022 | Qu | ........................ | H04N 23/60 |
| 2023/0188826 A1* | 6/2023 | Wu | ........................ | H04N 23/80 |
| | | | | 348/222.1 |

* cited by examiner

FIG.2
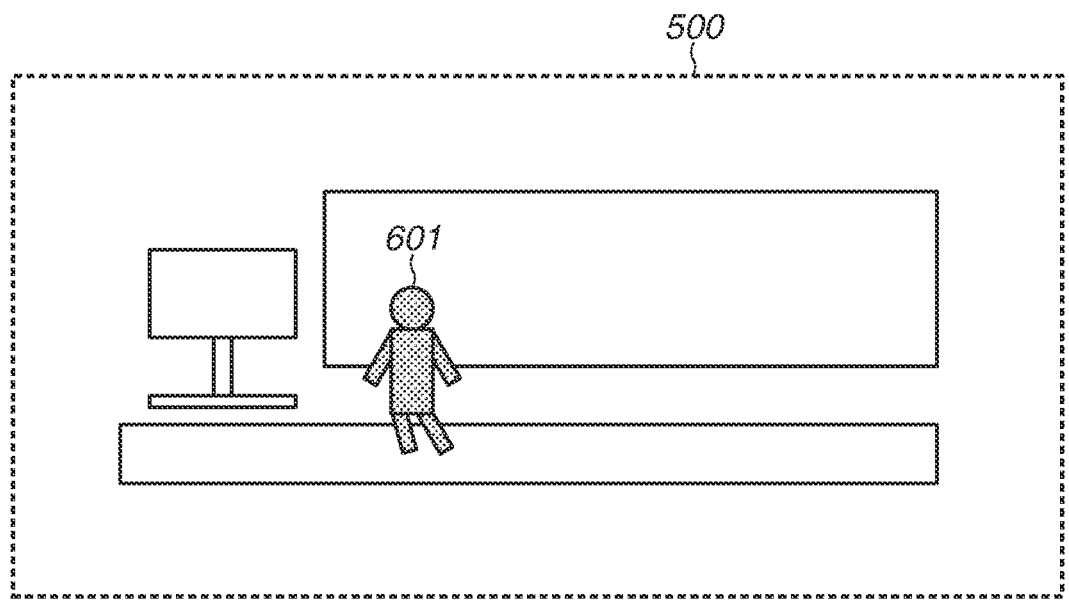
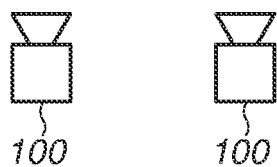

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

There has been an increase in imaging systems for capturing lecture scenes using a pan, tilt, and zoom (PTZ) camera capable of performing PTZ control to record and transmit the captured scenes. There has also been an increase in the needs of automatic imaging systems for automatically capturing an image while detecting a lecturer as a tracking target subject by using a PTZ camera having an automatic imaging function, to save the manpower.

Japanese Patent Application Laid-Open No. 2020-188297 discloses a technique for tracking a subject by using cameras for performing tracking image capturing for the subject, based on both motion information indicating positional changes of the subject detected by a main camera and motion information for the subject detected by a sub camera for capturing the same subject. This technique enables the tracking image capturing for the subject even in a situation where it is difficult to detect the motion of the subject with the main camera.

The above-described imaging systems estimate the orientation of the subject based on captured images to enable detecting a gesture by the motions of the subject's hands or arms. If a system is configured to automatically control the imaging range of a camera in response to a detected gesture, the lecturer as a subject can control the camera as intended with a gesture, making it possible to perform intended image capturing without a photographer.

If such a gesture-controlled camera is capturing the face of the gesturing subject in close up or capturing an object other than the gesturing subject, however, the arms or hands for performing a gesture may not be included in the captured image. The camera can therefore detect no gesture based on the captured images, making it impossible to perform camera control based on gesture information.

SUMMARY

The present disclosure is directed to enabling imaging apparatuses to perform suitable control in response to a gesture of a subject regardless of the imaging states of the imaging apparatuses.

According to an aspect of the present disclosure, an information processing apparatus includes a detection unit configured to detect, based on images captured by a first imaging apparatus, a gesture performed by a subject, the first imaging apparatus being among a plurality of imaging apparatuses that includes a second imaging apparatus, different from the first imaging apparatus, the second imaging apparatus being configured to be controlled based on the gesture performed by the subject, an acquisition unit configured to acquire control information for controlling the second imaging apparatus, the control information being associated with the gesture information detected by the detection unit, and a control unit configured to control the second imaging apparatus based on the control information acquired by the acquisition unit.

Further features of the present disclosure will become apparent from the following description of exemplary embodiments with reference to the attached drawings.

BRIEF DESCRIPTION OF THE DRAWINGS

FIG. 2 illustrates an installation example of cameras.

FIGS. 9A, 9B, 9C-1, and 9C-2 illustrate examples of changing the gesture detection camera.

DESCRIPTION OF THE EMBODIMENTS

Exemplary embodiments of the present disclosure will be described below with reference to the accompanying drawings.

The following exemplary embodiments are to be considered as illustrative examples for achieving the present disclosure, and may be corrected or modified as required depending on the configuration of an apparatus according to the present disclosure and other various conditions. The present disclosure is not limited to the following exemplary embodiments.

A first exemplary embodiment of the present disclosure will now be described.

[System Configuration]

Figure 1:
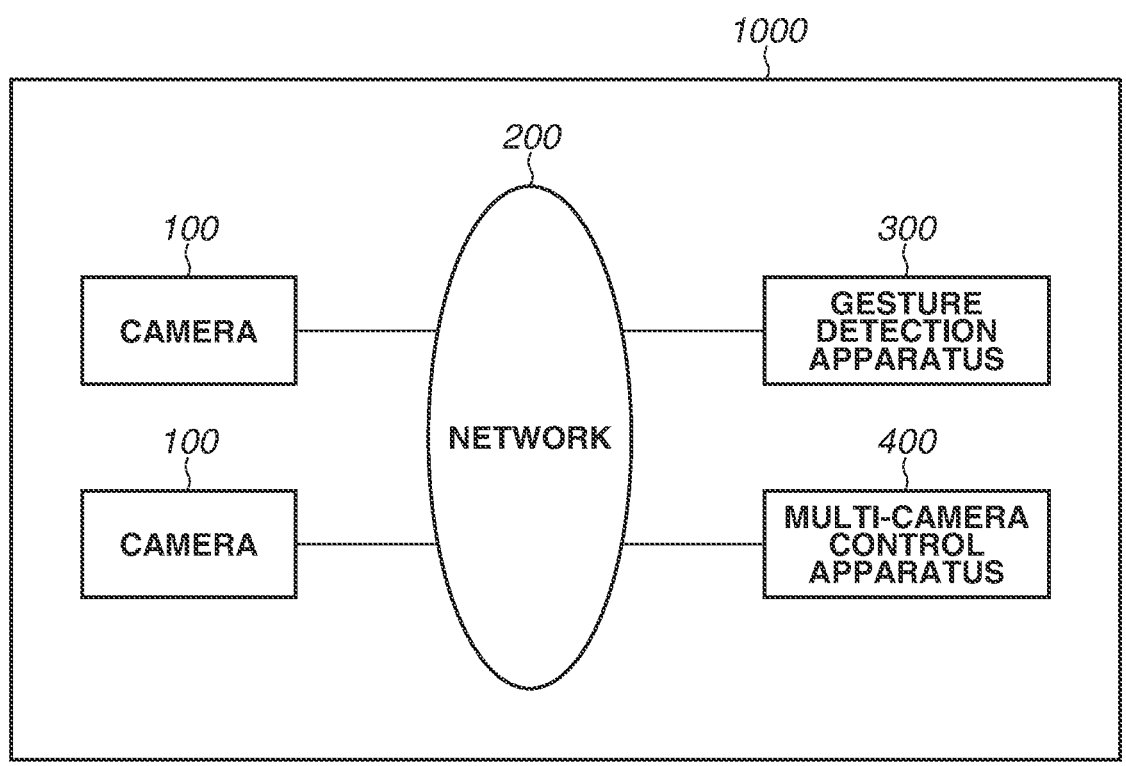
FIG. 1 illustrates a configuration example of an imaging system according to an exemplary embodiment.

FIG. 1 illustrates an example of an overall configuration of an imaging system 1000 according to the present exemplary embodiment.

As illustrated in FIG. 1, the imaging system 1000 includes a plurality of network cameras (hereinafter simply referred to as "cameras") 100, a network 200, a gesture detection apparatus 300, and a multi-camera control apparatus 400. The plurality of the cameras 100, the gesture detection apparatus 300, and the multi-camera control apparatus 400 are connected with each other via the network 200.

Figure 9A:
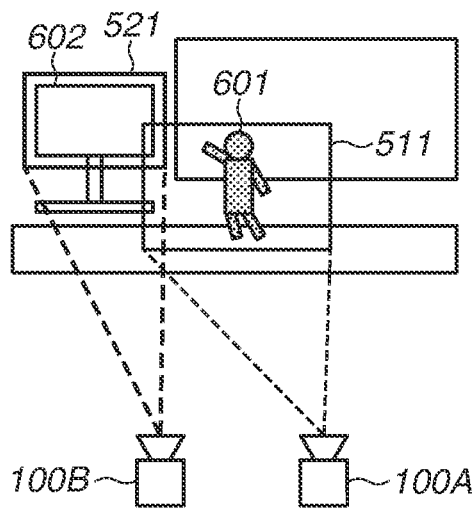
Figure 9B:
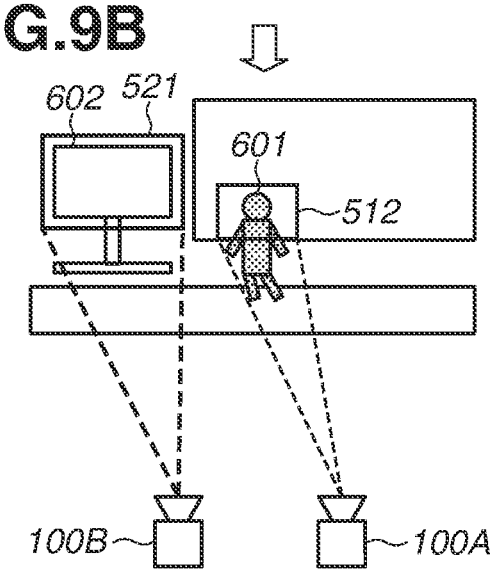
Figures 1, 9C:
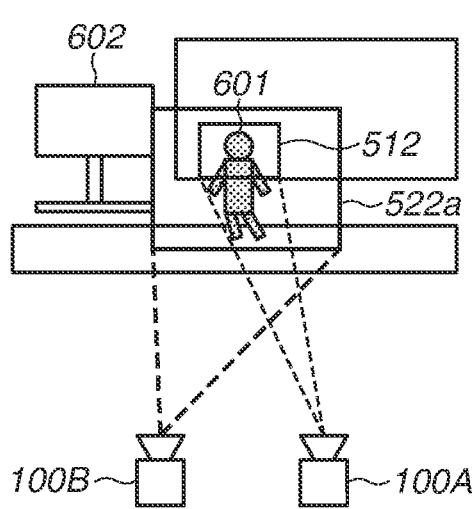
Figures 2, 9C:
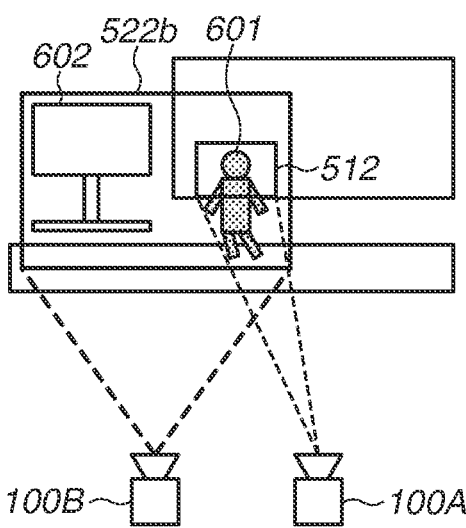

As illustrated in FIG. 2, the plurality of the cameras 100 is installed being oriented toward an imaging region 500 to capture a predetermined region in the imaging region 500. The present exemplary embodiment will be described below centering on an example where the cameras 100 automatically capture and record lecture scenes by a subject 601 as a lecturer in the imaging region 500 as a lecture room. However, the imaging region 500 is not limited to a lecture room but can be a photographing studio or a platform stage.

The plurality of the cameras 100 is an imaging apparatus that can be remote-controlled from the gesture detection apparatus 300 and the multi-camera control apparatus 400 via the network 200. The cameras 100 each can have an automatic imaging function for automatically capturing the subject 601 based on instructions (automatic imaging instructions) for the automatic image capturing method from the gesture detection apparatus 300 and the multi-camera control apparatus 400.

For example, the cameras 100 can automatically perform tracking image capturing for the subject 601 by performing a PTZ (pan, tilt, and zoom) control in response to the motion of the subject 601 based on the above-described automatic imaging instructions. The above-described automatic imaging instructions include an instruction related to the subject 601 to be subjected to tracking image capturing and an instruction related to an imaging composition of the subject 601. Based on the automatic imaging instructions, the cameras 100 identify the imaging target subject, for example, through human body detection or face recognition, and perform the PTZ control so that the subject 601 appears in a specific size (e.g., whole body shot) at a specific position in the image (e.g., at the center of the image).

The plurality of the cameras 100 can also transmit imaging data and imaging information in response to requests of the gesture detection apparatus 300 and the multi-camera control apparatus 400. The imaging information refers to information about the imaging states of the cameras 100, and includes information about the subject 601 during image capturing, imaging composition, and PTZ values.

The present exemplary embodiment will be described below centering on a case where the cameras 100 have the automatic imaging function. However, the cameras 100 may be connected with an external automatic imaging apparatus for detecting a subject in captured images and issuing PTZ control instructions.

If the imaging region 500 includes a lecture room, the cameras 100 having the automatic imaging function in the imaging system 1000 can be other than cameras for performing the tracking image capturing on the lecturer.

For example, the imaging system 1000 can include cameras 100 for capturing students being lectured as subjects, or cameras 100 for capturing a whiteboard, blackboard, monitor, or screen other than persons.

In a case of the imaging system 1000 using a plurality of the cameras 100 capable of performing the PTZ control, the cameras 100 can perform an automatic image capturing while changing the imaging targets depending on the situation of the imaging region 500. Further, the imaging system 1000 can include not only cameras for implementing the automatic imaging function through the PTZ control but also at least one camera fixed as an overview camera for constantly capturing the entire or almost entire portion of the imaging region 500. In such a case, the multi-camera control apparatus 400 can grasp the situation of the imaging region 500 based on imaging data of the overview camera, and issue an automatic imaging instruction to the cameras 100 performing the automatic image capturing.

The network 200 can be implemented by, for example, a plurality of routers, switches, and cables conforming to communication standards, such as Ethernet®. The network 200 can be implemented by the Internet, wired Local Area Network (LAN), wireless LAN, Wide Area Network (WAN), or a combination of these networks.

The communication standard, scale, and configuration of the network 200 are optional as long as the network 200 is configured such that the cameras 100, the gesture detection apparatus 300, and the multi-camera control apparatus 400 can communicate with each other.

The gesture detection apparatus 300 includes, for example, a personal computer (PC) or a server apparatus, and is provided with a gesture detection function and a camera control function. The gesture detection function is a function of detecting a gesture of the subject 601 based on captured images of a specific camera 100. The camera control function is a function of instructing the camera 100 having detected the gesture or another specific camera 100 to perform control corresponding to the detected gesture (gesture control).

Examples of methods for detecting a gesture of a subject based on captured images include a method of determining a pose of the subject by detecting the human body of the subject based on captured images, and identifying body parts, such as the head, neck, shoulders, elbows, and hands, to estimate the orientation. Identifying the pose of the subject enables detecting a gesture, such as raising a hand and stretching both hands to both sides. The method for detecting a gesture is not limited to the above-described method and can be changed depending on the detection target gesture. For example, a method of detecting fine movement of the arms or fingers recognizing the joints of the arms or fingers can be used.

The gesture detection apparatus 300 can also receive a user operation, select the camera to be subjected to the gesture control, and register the detection target gestures and the corresponding camera control.

Examples of the detection target gestures include the above-described pose of the subject (e.g., raising a hand) and a change of the pose (e.g., raising and then lowering a hand). When the subject keeps the same pose for a predetermined period of time or longer, the method can detect the pose as a gesture. In this case, the number of frames to be maintained for detection can be finely set. The detection target gestures can also include combinations of a plurality of pre-registered gestures.

Examples of the camera control corresponding to gestures include control of the automatic image capturing method, preset control for performing the PTZ control such that the imaging range is set to a pre-registered imaging range, and imaging range control by changing PTZ values during gesture detection.

The gesture detection apparatus 300 can register a plurality of patterns of correspondence between a gesture and camera control, depending on the camera to be subjected to the gesture control.

The multi-camera control apparatus 400 can include, for example, a PC, server apparatus, or tablet terminal. The multi-camera control apparatus 400 can issue imaging instructions to the plurality of the cameras 100 to manage the imaging states of the plurality of the cameras 100.

Imaging instructions to the cameras 100 include an automatic imaging instruction for tracking and capturing a specific person and an imaging instruction for capturing overview images or capturing a specific subject in a specific imaging composition.

The multi-camera control apparatus 400 can further include an image analysis function or an imaging determination function. In such a case, the multi-camera control apparatus 400 analyzes, for example, captured images generated by the overview camera out of the plurality of the cameras 100 to detect positions and motions of the lecturer and students in the lecture room as the imaging region 500 at the time of lecture recording. The multi-camera control apparatus 400 can determine how the imaging region 500 is to be captured, based on the detection result, and issue an automatic imaging instruction to the cameras having the automatic imaging function out of the plurality of the cameras 100.

The configuration of the imaging system 1000 is not limited to the configuration illustrated in FIG. 1. For example, the number of the cameras 100 connected to the network 200 is not limited to the number illustrated in FIG. 1. Two or more cameras 100 can also be connected to the network 200. A plurality of the gesture detection apparatuses 300 can also be connected to the network 200. Further, the gesture detection apparatus 300 and the multi-camera control apparatus 400 are not limited to physically independent apparatuses, but can also be formed of an identical apparatus (for example, a PC).

Instead of separately preparing the gesture detection apparatus 300 and the cameras 100, the cameras 100 can be provided with the gesture detection function and communicate a gesture detection result between the plurality of the cameras 100 to perform camera control corresponding to the gesture detection.

[Hardware Configuration]

A hardware configuration of each apparatus according to the present exemplary embodiment will now be described.

Figure 3:
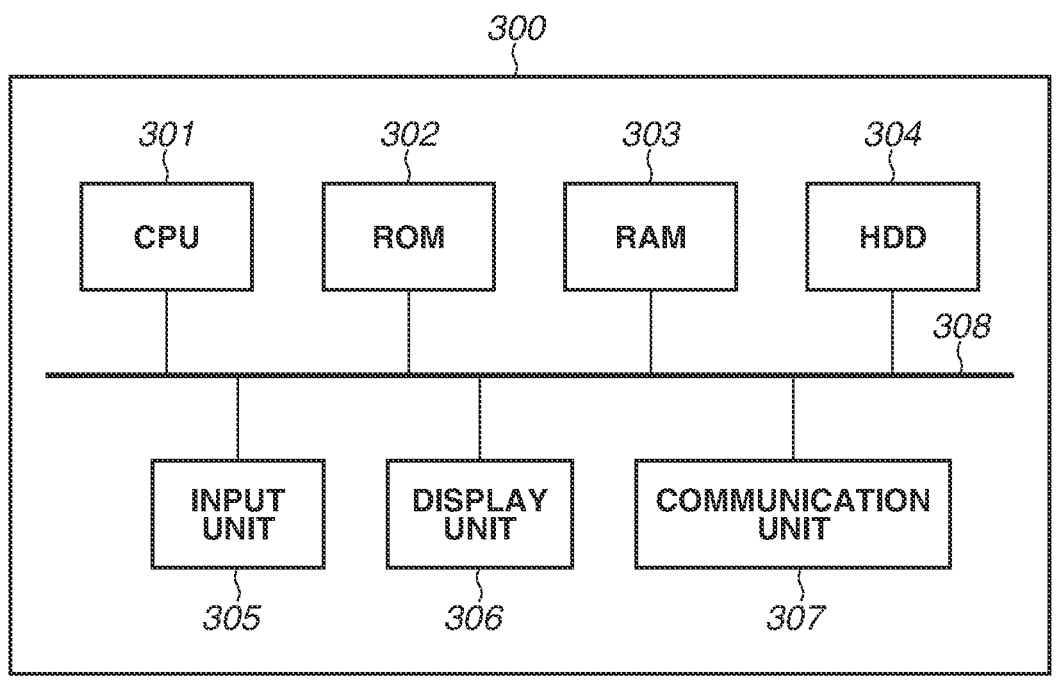
FIG. 3 illustrates an example of a hardware configuration of a gesture detection apparatus.

FIG. 3 illustrates an example hardware configuration of the gesture detection apparatus 300 according to the present exemplary embodiment. The gesture detection apparatus 300 includes a central processing unit (CPU) 301, a read only memory (ROM) 302, a random access memory (RAM) 303, a hard disk drive (HDD) 304, an input unit 305, a display unit 306, and a communication unit 307. The gesture detection apparatus 300 also include other components.

The CPU 301 totally controls the operation of the gesture detection apparatus 300. The ROM 302 includes a storage area for storing programs and data used for the CPU 301 to perform processing. The programs can be stored in the HDD 304 or a removable storage medium (not illustrated). The RAM 303 functions as the main memory and a work area for the CPU 301. In processing execution, various functions and operations are implemented when the CPU 301 loads required programs from the ROM 302 into the RAM 303 and then executes the programs.

The HDD 304 is used as a permanent storage area for storing an operating system (OS), various programs, and various data. The HDD 304 is also used as a storage area for storing various short-term data. Other auxiliary storage devices, such as a solid state disk (SSD), can also be used instead of the HDD 304.

The input unit 305 including a keyboard, mouse, joystick, touch panel, and other operation members receives user operations on the operation members, and inputs various instructions to the CPU 301.

The display unit 306 including a monitor, such as a liquid crystal display (LCD), displays a graphical user interface (GUI) used by a user to operate the gesture detection apparatus 300. The CPU 301 can operate as a display control unit for controlling the display unit 306. The communication unit 307 communicates data with external apparatuses, such as the cameras 100 and the multi-camera control apparatus 400, via the network 200.

The present exemplary embodiment will be described below centering on a case where the gesture detection apparatus 300 includes the input unit 305 and the display unit 306. However, at least either one of the input unit 305 or the display unit 306 can be provided as a separate apparatus outside the gesture detection apparatus 300.

A part or all of the functions of the gesture detection apparatus 300 are implemented when the CPU 301 executes a program stored in the ROM 302 or HDD 304. However, at least a part of the functions of the gesture detection apparatus 300 can operate as a dedicated hardware component. In such a case, the dedicated hardware component operates under the control of the CPU 301.

The multi-camera control apparatus 400 may have a hardware configuration similar to that of the gesture detection apparatus 300.

The hardware configuration of the cameras 100 also conforms to the hardware configuration illustrated in FIG. 3. However, each of the cameras 100 includes an imaging unit instead of the display unit 306. The imaging unit captures a subject and generates a captured image. The imaging unit can include, for example, a complementary metal oxide semiconductor (CMOS) or charge coupled device (CCD) image sensor, an analog-to-digital (A/D) converter, and a development processing unit. In the case of the cameras 100, the input unit 305 includes a power button and setting buttons. The operator of the cameras 100 can issue instructions to the cameras 100 via the input unit 305.

A part or all of the functions of the cameras 100 are implemented when the CPU of the cameras 100 corresponding to the CPU 301 executes a program. However, at least a part of the functions of the cameras 100 may operate as a dedicated hardware component. In this case, the dedicated hardware component operates under the control of the CPU.

The present exemplary embodiment will now be described centering on a case where the gesture detection apparatus 300 functions as an information processing apparatus that detects a gesture of the subject based on captured images of the cameras 100 and performs camera control corresponding to the detected gesture. However, the multi-camera control apparatus 400 or a general PC communicably connected with the cameras 100 can operate as the above-described information processing apparatus. Alternatively, any one of the plurality of the cameras 100 can operate as the above-described information processing apparatus.

[Functional Configuration]

Figure 4:
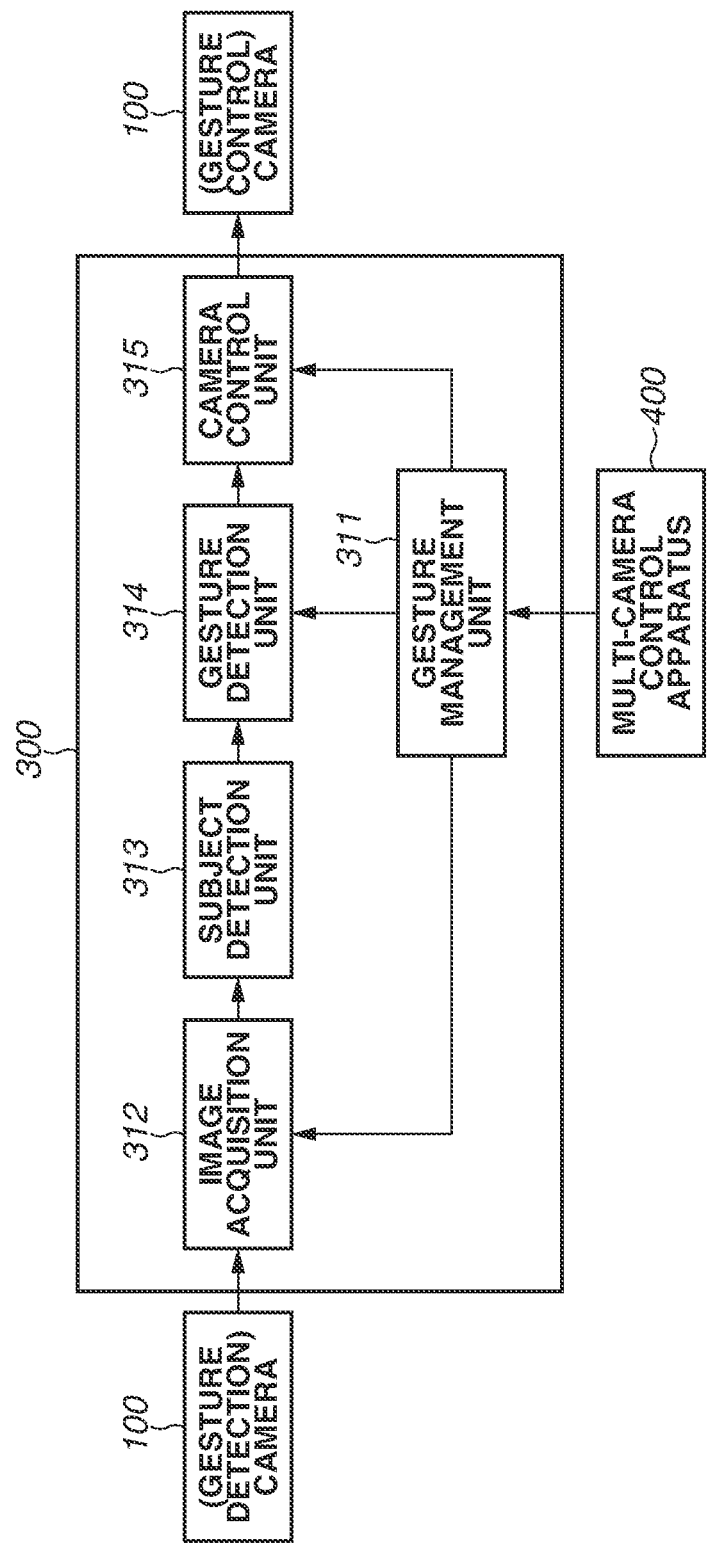
FIG. 4 is a block diagram illustrating a functional configuration example of a gesture detection apparatus.

FIG. 4 is a block diagram illustrating an example of a functional configuration of the gesture detection apparatus 300.

The gesture detection apparatus 300 includes a gesture management unit 311, an image acquisition unit 312, a subject detection unit 313, a gesture detection unit 314, and a camera control unit 315.

The elements illustrated in FIG. 4 can be implemented when the CPU 301 of the gesture detection apparatus 300 executes corresponding processing programs. However, at least a part of the elements illustrated in FIG. 4 can be implemented by a dedicated hardware component. In this case, the dedicated hardware component operates under the control of the CPU 301.

The present exemplary embodiment will now be described centering on a case where the gesture detection apparatus 300 is provided with the functions illustrated in FIG. 4. However, a part of the functions can be provided by other apparatuses.

The gesture management unit 311 manages information about a gesture detection camera and information about a gesture control camera out of the plurality of the cameras 100 in the imaging system 1000. The gesture detection camera captures images used for gesture detection. The gesture control camera is a camera of which the imaging state is controlled according to the gesture information detected based on captured images.

The gesture detection camera and the gesture control camera can be an identical camera or different cameras. Although, in the present exemplary embodiment, the gesture detection camera and the gesture control camera are selected by the user, the gesture detection camera can be decided by the gesture detection apparatus 300. In such a case, for example, the gesture detection apparatus 300 can acquire the imaging states of the plurality of the cameras 100 from the multi-camera control apparatus 400, and determine the gesture detection camera based on the acquired imaging states.

The gesture management unit 311 also manages detection target gesture information and correspondence information that associates the gesture information with camera control information, as management information.

The above-described management information can be stored in advance, or registered and changed by the user. The gesture management unit 311 can also manage a plurality of patterns of the above-described management information based on the imaging state of the gesture control camera. The above-described management information can be managed by an external apparatus. In this case, the gesture management unit 311 can also acquire the management information from the external apparatus.

The image acquisition unit 312 receives imaging data from the gesture detection camera out of the plurality of the cameras 100 based on the information about the gesture detection camera managed by the gesture management unit 311. The image acquisition unit 312 then subjects the received imaging data to image processing and transmits the imaging data having been subjected to the image processing to the subject detection unit 313.

The subject detection unit 313 analyzes the image received from the image acquisition unit 312 to detect a person as a subject performing a gesture, estimates the orientation of the detected person, and transmits information about the estimated orientation to the gesture detection unit 314. When only the gestures of a specific person in the image are to be enabled, the subject detection unit 313 identifies the person based on pre-registered personal features and transmits the orientation information only for the identified person to the gesture detection unit 314. In contrast, when the gestures of all persons in the image are to be enabled, the subject detection unit 313 transmits personal information, such as identifiers (IDs) and personal features of registered persons, together with the orientation information to the gesture detection unit 314.

The gesture detection unit 314 performs the gesture detection by using the orientation information for the person received from the subject detection unit 313, based on the detection target gesture information acquired from the gesture management unit 311. Gestures to be detected are not limited to specific ones. Examples of detection targets include a pose of the subject in one frame, the same pose continuing in a plurality of frames, and a pose change over a plurality of frames. When performing the gesture detection by using the orientation information for a plurality of frames, the gesture detection unit 314 performs the gesture detection by using the orientation information for the same person based on the personal information received from the subject detection unit 313.

Upon detection of the detection target gesture, the gesture detection unit 314 notifies the camera control unit 315 of the detected gesture information.

Upon reception of the notification of the gesture information from the gesture detection unit 314, the camera control unit 315 refers to the correspondence information acquired from the gesture management unit 311 to acquire the camera control information corresponding to the gesture information detected by the gesture detection unit 314. The camera control unit 315 can acquire the camera control information corresponding to the gesture information detected by the gesture detection unit 314, from an external apparatus.

The camera control unit 315 then transmits a camera control instruction based on the above-described camera control information to the gesture control camera, based on the information about the gesture control camera managed by the gesture management unit 311.

[Processing Flow]

A processing flow for implementing the gesture detection function and the camera control function in the gesture detection apparatus 300 according to the present exemplary embodiment will now be described with reference to FIG. 5.

In here, a processing flow will be described in a case where the overview camera is used as the gesture detection camera. In this case, the processing detects a gesture of the subject 601 as the lecturer based on captured images of the overview camera, and records a lecture while controlling the gesture control camera in response to the detected gesture.

Figure 6:
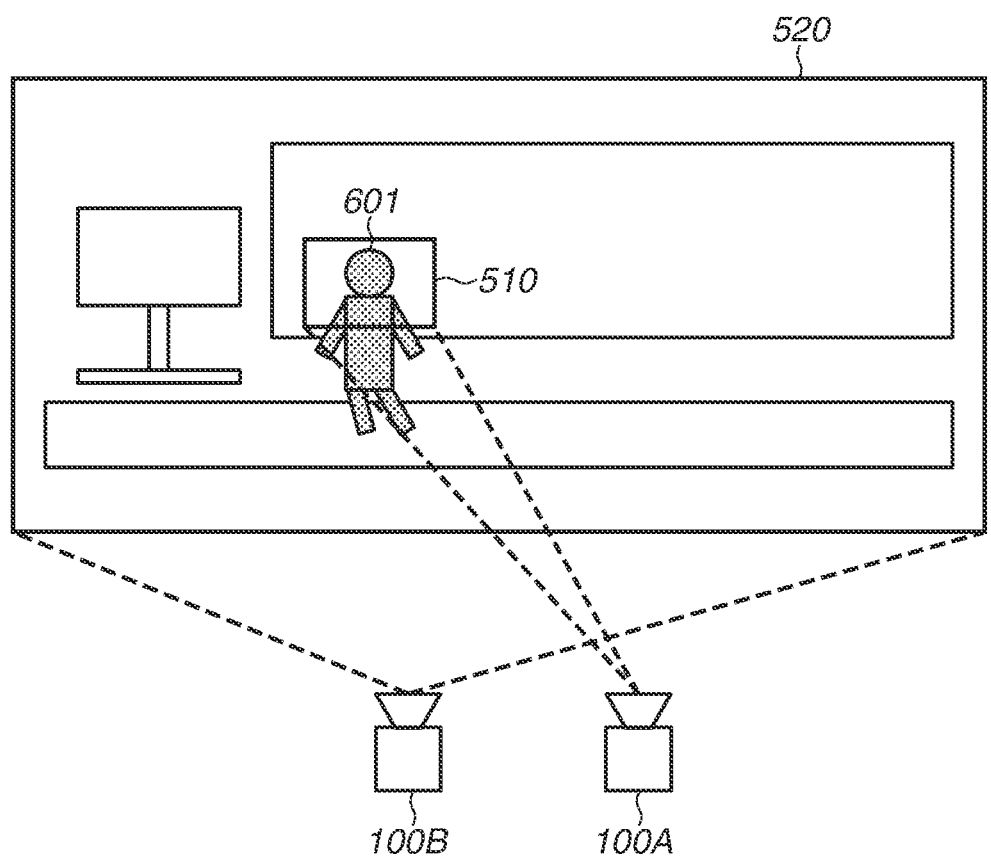
FIG. 6 illustrates examples of a gesture control camera and a gesture detection camera.

FIG. 6 illustrates the gesture detection camera and the gesture control camera. A camera 100A is a target camera for performing the tracking image capturing for the subject 601, and is assumed to capture an imaging range 510 including the subject 601. A camera 100B is an overview camera for capturing the entire range where the subject 601 possibly moves, and is assumed to be capturing an imaging range 520.

Figure 5:
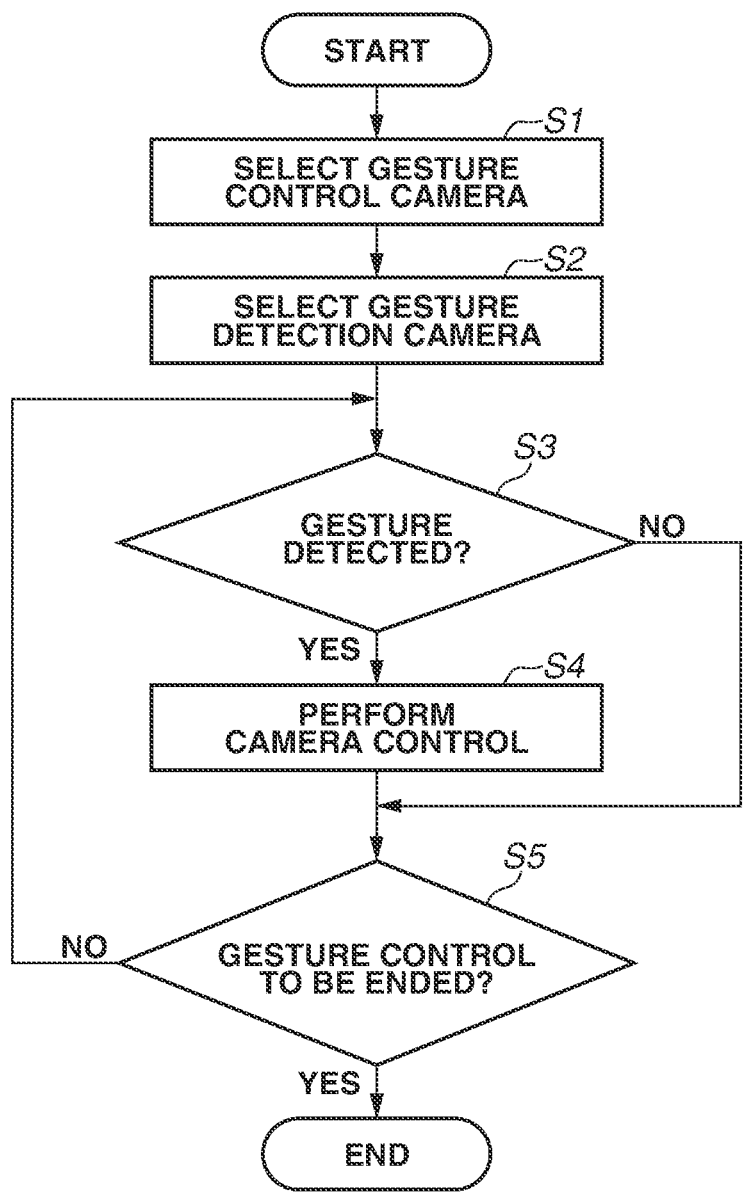
FIG. 5 is a flowchart illustrating an example of processing of the gesture detection apparatus.

The gesture detection apparatus 300 implements the processing illustrated in FIG. 5 when the CPU 301 in FIG. 3 reads a program to be used and then executes the program. Hereinafter, the alphabet S means a step in flowcharts.

Referring to FIG. 5, in step S1, the gesture management unit 311 selects the gesture control camera from among the plurality of the cameras 100. More specifically, the gesture management unit 311 acquires the information about the gesture control camera specified by a user operation. The gesture management unit 311 can also acquire the imaging states of the plurality of the cameras 100 from the multi-camera control apparatus 400 and selects the gesture control camera based on the acquired imaging information. The gesture management unit 311 can also acquire information about the gesture control camera selected based on the imaging states of the plurality of the cameras 100 by the multi-camera control apparatus 400.

For example, the target camera currently performing the tracking image capturing for the subject 601 can be selected as the gesture control camera. In the example illustrated in FIG. 6, the camera 100A is selected as the gesture control camera.

In step S2, the gesture management unit 311 selects the gesture detection camera from among the plurality of the cameras 100. More specifically, the gesture management unit 311 acquires information about the gesture detection camera specified by a user operation. The gesture management unit 311 can also acquire the imaging states of the plurality of the cameras 100 from the multi-camera control apparatus 400 and select the gesture detection camera based on the acquired imaging information. The gesture management unit 311 can also acquire information about the gesture detection camera selected based on the imaging states of the plurality of the cameras 100 by the multi-camera control apparatus 400.

For example, the overview camera for capturing the entire range where the subject 601 possibly moves is selected as the gesture detection camera. In the example illustrated in FIG. 6, the camera 100B is assumed to be selected as the gesture detection camera.

In step S3, the gesture detection apparatus 300 determines whether the detection target gesture is detected based on captured images of the gesture detection camera. In step S3, the image acquisition unit 312 acquires the imaging data of the camera 100B selected as the gesture detection camera in step S2, subjects the imaging data to image processing, and transmits the imaging data to the subject detection unit 313. The subject detection unit 313 detects the orientation information for the subject 601 based on the images acquired from the image acquisition unit 312. The gesture detection unit 314 then performs the gesture detection based on the detection target gesture information managed by the gesture management unit 311 by using the orientation information detected by the subject detection unit 313.

When the gesture detection apparatus 300 determines that the detection target gesture is detected as a result of the gesture detection by the gesture detection unit 314 (YES step S3), the processing proceeds to step S4. In contrast, when the gesture detection apparatus 300 determines that the detection target gesture is not detected (NO in step S3), the processing proceeds to step S5.

In step S4, the camera control unit 315 refers to the correspondence information that associates the gesture information managed by the gesture management unit 311 with the camera control information, and determines the camera control information corresponding to the gesture information detected in step S3. Based on the determined camera control information, the camera control unit 315 issues a camera control instruction to the camera 100A selected as the gesture control camera in step S1.

In step S5, the gesture detection apparatus 300 determines whether a gesture control end instruction by the user is received. If the gesture control end instruction is not received (NO in step S5), the processing returns to step S3. In contrast, if the gesture control end instruction is received (YES in step S5), the processing ends the flowchart in FIG. 5.

The above-described processing flow enables detecting a gesture of the subject 601 based on captured images of the overview camera as the gesture detection camera different from the gesture control camera, and controlling an imaging state of the target camera as the gesture control camera based on the detected gesture information. This enables suitably performing the gesture control regardless of the imaging state of the gesture control camera, accordingly.

As described above, the gesture detection apparatus 300 according to the present exemplary embodiment controls the imaging state of the gesture control camera in response to the gesture of the subject 601. In this case, the gesture detection apparatus 300 detects gesture information for the subject 601 based on captured images of the gesture detection camera different from the gesture control camera, and acquires the camera control information associated with the detected gesture information. Then, the gesture detection apparatus 300 controls the imaging state of the gesture control camera based on the acquired camera control information.

As described above, the gesture detection apparatus 300 performs the gesture detection by using captured images of a camera different from the gesture control camera. This enables suitably acquiring the gesture information even if the gesture control camera has not captured body parts of the subject 601 used for the gesture detection. This enables suitably controlling the imaging state of the gesture control camera in response to the gesture of the subject 601.

In this case, the overview camera for capturing the wide range where the subject 601 possibly moves can be selected from among the plurality of cameras 100 as the gesture detection camera for performing the gesture detection. Using the overview camera as the gesture detection camera in this way enables suitably detecting a gesture of the subject 601.

The gesture detection apparatus 300 manages the correspondence information that associates the gesture information for the subject 601 with the camera control information. Thus, the gesture detection apparatus 300 can refer to the correspondence information to acquire the camera control information associated with the gesture information detected in the gesture detection. This enables suitably performing the camera control according to the gesture of the subject 601. Configuring the above-described correspondence information to be registered and changed by the user enables the gesture control based on the intention of the subject 601 performing gestures.

As described above, the present exemplary embodiment makes it possible to suitably perform the camera control based on the gesture of the subject 601 regardless of the imaging state of the gesture control camera.

A second exemplary embodiment of the present disclosure will now be described.

The first exemplary embodiment has been described above centering on a case where the gesture detection camera and the gesture control camera are constantly different cameras. In the second exemplary embodiment, a case will be described where the gesture detection camera and the gesture control camera are an identical camera. An example case will be described where the gesture detection camera is changed to another camera. This case occurs, for example, if the gesture of the subject 601 cannot be detected because of the changed angle of field of the gesture control camera during the gesture detection based on captured images of the gesture control camera.

The imaging system according to the second exemplary embodiment can have a configuration similar to that of the imaging system 1000 illustrated in FIG. 1. The hardware configuration of the gesture detection apparatus 300 is similar to that illustrated in FIG. 3.

[Functional Configuration]

Figure 7:
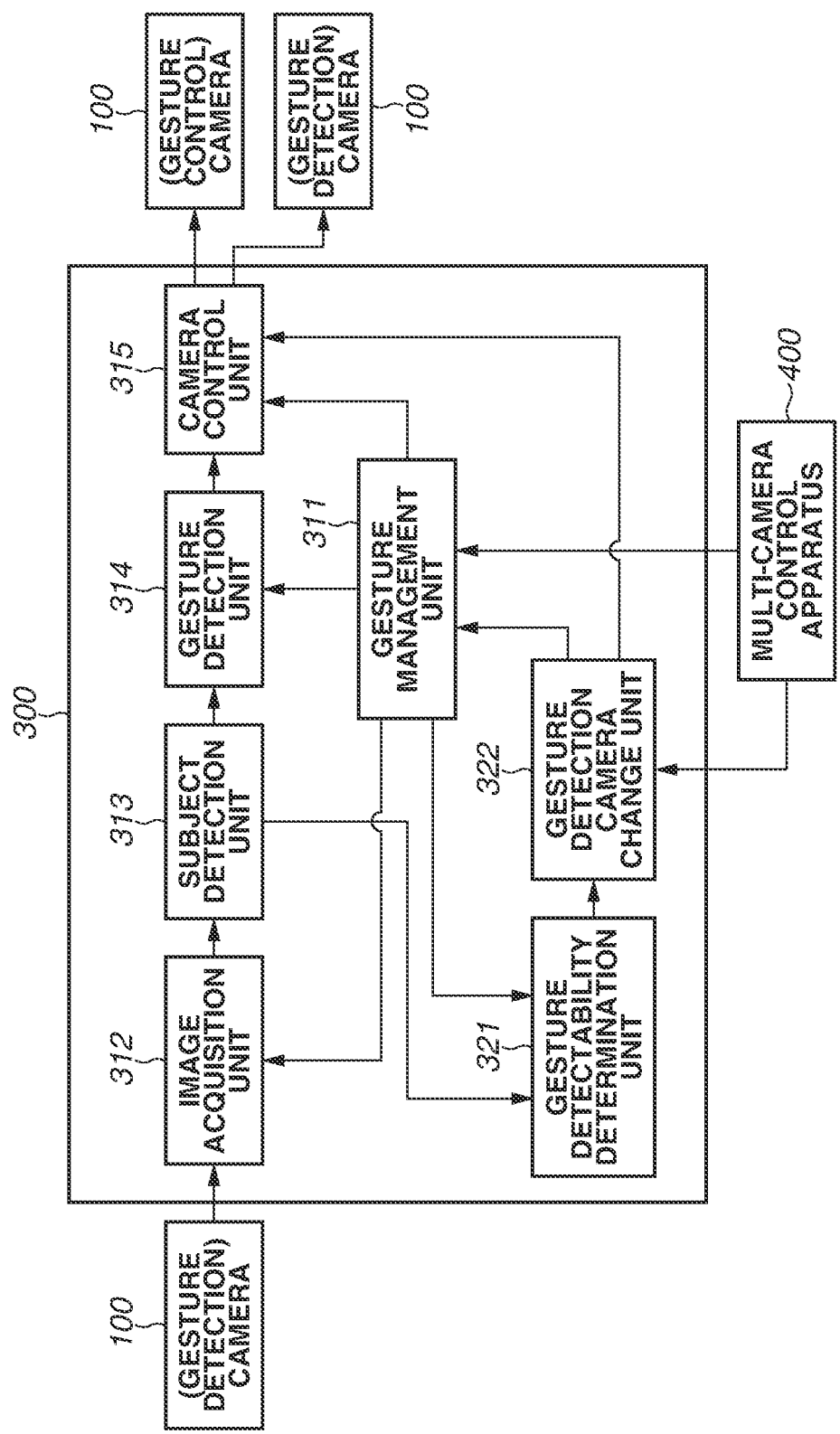
FIG. 7 is a block diagram illustrating a functional configuration example of the gesture detection apparatus.

FIG. 7 is a block diagram illustrating an example of a functional configuration of the gesture detection apparatus 300 according to the second exemplary embodiment. Referring to FIG. 7, elements having the same configuration as the functional configurations illustrated in FIG. 4 are assigned the same reference numerals. Elements having different configurations will mainly be described below.

When a gesture detectability determination unit 321 receives subject's orientation information in captured images of the gesture detection camera via the image acquisition unit 312 and the subject detection unit 313, the gesture detectability determination unit 321 determines whether the gesture detection based on captured images of the gesture detection camera is possible. When the gesture detectability determination unit 321 determines that the gesture detection is not possible, the gesture detectability determination unit 321 notifies a gesture detection camera change unit 322 of the determination result.

Whether the gesture detectability determination unit 321 can perform the gesture detection can be determined based on the detection target gesture information managed by the gesture management unit 311. If gestures by the motions of the arms or hands of the subject 601 are detection targets, the gesture detectability determination unit 321 determines whether the gesture detection is possible by determining whether the arms or hands of the subject 601 have been detected based on captured images. If the motions of the legs are included in the detection target gestures, the gesture detectability determination unit 321 determines whether the gesture detection is possible by determining whether the legs of the subject 601 have been detected based on captured images. In this way, the gesture detectability determination unit 321 changes the determination method according to the detection target gesture information.

When the gesture detection camera is performing the automatic image capturing, the gesture detectability determination unit 321 can determine whether the gesture detection is possible based on the imaging state of the automatic imaging. For example, if the gesture detection camera is performing the tracking image capturing by using an automatic zoom adjustment function for maintaining fixed sizes of the face or body of the subject 601 in captured images, the gesture detectability determination unit 321 can determine whether the gesture detection is possible based on zoom modes.

Examples of zoom modes include a whole body mode for capturing a whole body, an upper body mode for capturing only an upper body, and a face closeup mode for capturing a face in closeup. When gestures by the motions of the arms or hands of the subject 601 are detection targets, the gesture detectability determination unit 321 determines that the gesture detection is possible in the whole body mode or the upper body mode and that the gesture detection is not possible in the face closeup mode.

The imaging state to be used for the gesture detectability determination, however, is not limited to the above-described zoom modes of the automatic zoom adjustment function. Any other modes are also applicable as long as these modes enable identifying whether captured images include body parts required for the gesture detection. The imaging state of the gesture detection camera can be acquired from the relevant gesture detection camera or the multi-camera control apparatus 400.

The detection target gesture information can also change according to the imaging state of the gesture control camera. Detection targets can be only gestures corresponding to the feasible camera control. For example, only specific camera control is enabled or disabled during image capturing in a specific mode, or gesture-based camera control is not accepted in a predetermined period of time after a specific mode is entered. More specifically, the gesture management unit 311 can manage the correspondence information that associates the detection target gesture information predetermined for the imaging state of the gesture control camera with the camera control information. In this case, the determination criterion used by the gesture detectability determination unit 321 to determine whether the gesture detection is possible varies depending on the imaging state of the gesture control camera.

If a camera other than the gesture control camera is used as the gesture detection camera, the gesture detectability determination unit 321 constantly determines whether the gesture detection is possible based on not only captured images of the gesture detection camera but also the gesture control camera. In this case, the gesture detectability determination unit 321 determines whether the gesture detection is possible based on captured images of the gesture control camera, via the image acquisition unit 312 and the subject detection unit 313.

When the gesture detection camera change unit 322 receives a notification notifying that the gesture detection is not possible from the gesture detectability determination unit 321, the gesture detection camera change unit 322 acquires the imaging states of the plurality of the cameras 100 included in the imaging system 1000 from the multi-camera control apparatus 400. The gesture detection camera change unit 322 then decides a new gesture detection camera from among the plurality of the cameras 100 to notify the gesture management unit 311 of the new camera. At this timing, upon reception of the relevant notification from the gesture detection camera change unit 322, the gesture management unit 311 stores (updates) the information about the gesture detection camera.

After deciding the new gesture detection camera, the gesture detection camera change unit 322 issues a camera control instruction for changing the imaging range to a gesture-detectable imaging range, to the new gesture detection camera via the camera control unit 315.

As an example of a camera control instruction method, the gesture detection camera change unit 322 issues information about the subject 601 to be fit into the imaging range, such as the subject information and information about body parts subjected to the gesture detection, and issues a PTZ control instruction for setting the imaging range to a gesture-detectable imaging range.

In a case where an overview camera like the camera 100B illustrated in FIG. 6 according to the above-described first exemplary embodiment is to be used as a new gesture detection camera, however, the gesture detection camera change unit 322 may not issue a camera control instruction assuming that there is no need to change the imaging range. The gesture detection camera change unit 322 can issue a camera control instruction to capture the subject 601 only when the subject 601 is out of the imaging range.

[Processing Flow]

A processing flow for implementing the gesture detection function and the camera control function in the gesture detection apparatus 300 according to the present exemplary embodiment will now be described with reference to FIG. 8. A processing flow for changing the gesture detection camera if the gesture detection based on captured images of the gesture control camera is determined to be impossible will now be described.

Figure 8:
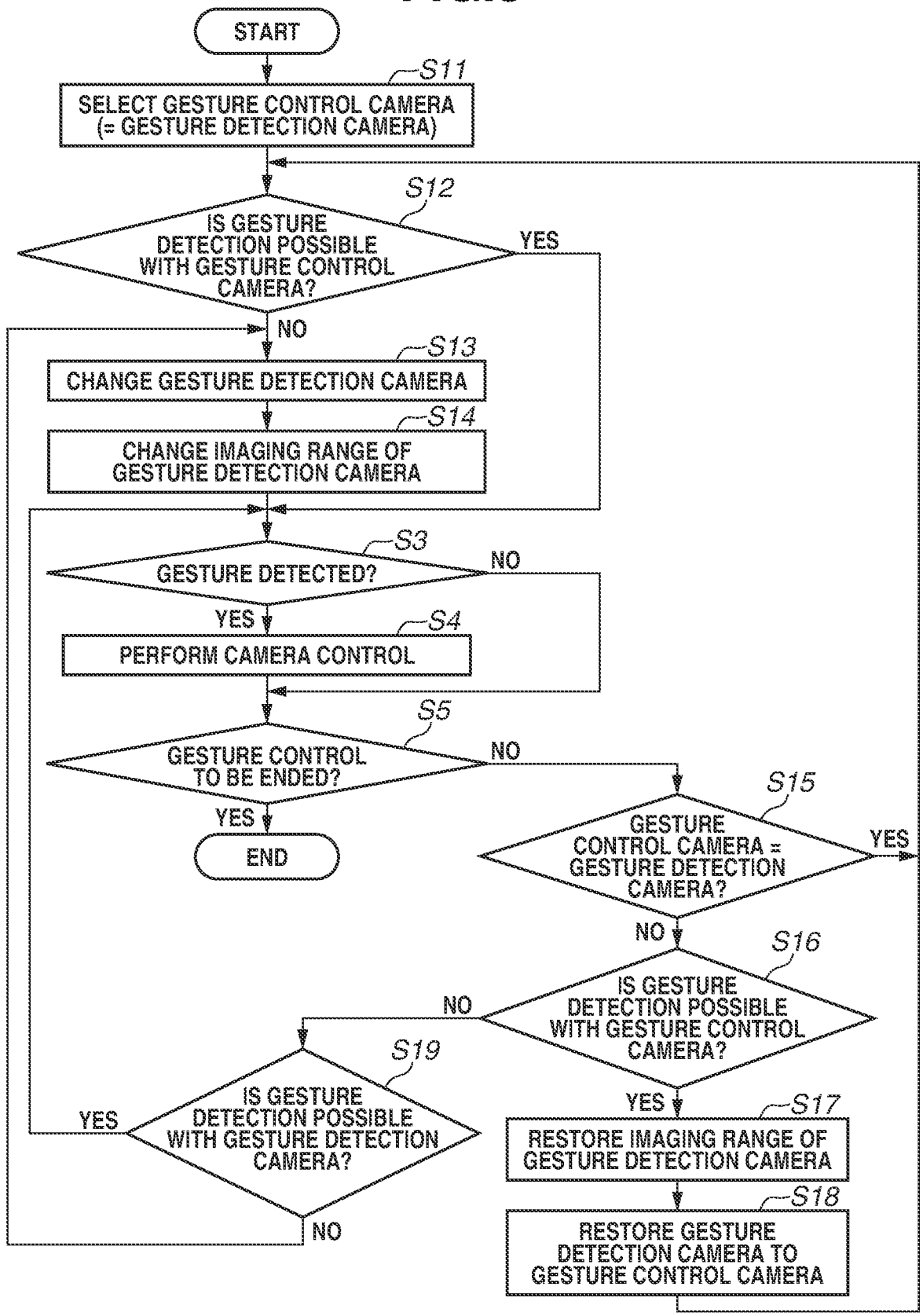
FIG. 8 is a flowchart illustrating another example of processing of the gesture detection apparatus.

Referring to FIG. 8, portions performing the same processing as the processing flow of the gesture detection apparatus 300 in FIG. 5 are assigned the same step numbers as those in FIG. 5. The following descriptions will be made centering on portions with different processing.

In the following descriptions, if the gesture control camera and the gesture detection camera are an identical camera, the gesture detection camera is also referred to as the gesture control camera.

FIGS. 9A, 9B, 9C-1, and 9C-2 illustrate examples of changing the gesture detection camera according to the present exemplary embodiment. FIGS. 9A to 9C-2 illustrate images of changes of the gesture detection camera and transitions of the imaging range of the gesture detection camera in the imaging system that records a lecture while performing camera control according to the gesture of the subject 601 as a lecturer.

The camera 100A is a target camera for performing tracking image capturing for the subject 601. At the timing illustrated in FIG. 9A, the camera 100A is capturing an imaging range 511 including the whole body of the subject 601. The cameras 100B is also capturing an imaging range 521 including a monitor 602. In the imaging system illustrated in FIGS. 9A to 9C-2, the camera 100B is assumed to be used not as an overview camera for constantly capturing all of the imaging targets but as a multi-purpose camera for capturing imaging targets while changing the imaging targets depending on the situation.

In step S11 of FIG. 8, the gesture management unit 311 selects the gesture control camera from among the plurality of the cameras 100. More specifically, the gesture management unit 311 acquires information about the gesture control camera specified by a user operation. In the present exemplary embodiment, the gesture detection is normally performed based on captured images of the gesture control camera, and thus the gesture management unit 311 acquires and stores the information about the gesture control camera specified by a user operation also as the information about the gesture detection camera.

As the gesture control camera, the target camera performing the tracking image capturing for the subject 601 can be selected, for example. In the example illustrated in FIG. 9A, the camera 100A is selected as the gesture control camera, and the gesture detection camera is also set to the camera 100A.

In step S12, the gesture detectability determination unit 321 determines whether the gesture detection is possible based on the subject's orientation information detected from captured images of the gesture control camera selected in step S11. If the gesture detectability determination unit 321 determines that the gesture detection is not possible (NO in step S12), the processing proceeds to step S13. In contrast, if the gesture detectability determination unit 321 determines that the gesture detection is possible (YES in step S12), the processing proceeds to step S3.

At the timing illustrated in FIG. 9A, the camera 100A captures the whole body of the subject 601 by using the automatic zoom adjustment function. If gestures by the motions of the arms or hands of the subject 601 are detection targets, the gesture detection for the subject 601 is possible based on captured images of the camera 100A. When the zoom mode of the automatic zoom adjustment function of the camera 100A is changed to the closeup face mode as illustrated in FIG. 9B, however, the imaging range 512 of the camera 100A include neither the arms nor the hands of the subject 601. Thus, the gesture detection unit 314 cannot perform the gesture detection for the subject 601 based on captured images of the camera 100A.

In this case, the gesture detectability determination unit 321 thus determines that the gesture detection is not possible using the camera 100A as the gesture control camera (NO in step S12). The processing then proceeds to step S13.

In step S13, the gesture detection camera change unit 322 decides a new gesture detection camera and notifies the gesture management unit 311 that the gesture detection camera has been changed. The gesture management unit 311 registers the new gesture detection camera notified of from the gesture detection camera change unit 322. The gesture detection camera is thereby changed.

In this case, the gesture detection camera is assumed to have been changed from the camera 100A to the other camera 100B.

If the gesture detection camera is changed in step S13, the information about the gesture detection camera can be presented to the subject 601 to allow the subject 601 to recognize the gesture detection camera. Examples of presentation methods include a presentation using a tally control for the cameras and a presentation using a screen display if captured images are displayed to the subject 601.

The information about the gesture detection camera can also be constantly presented to the subject 601 during reception of the gesture detection. The information about the gesture detection camera can also be presented to the subject 601 only when the gesture detection camera is different from the gesture control camera.

Presenting the information about the gesture detection camera to the subject 601 allows the subject 601 to recognize which camera's captured images are currently used for the gesture detection, and determine which camera it is preferable to perform a gesture toward.

In step S14, the gesture detection camera change unit 322 issues a camera control instruction for changing the imaging range to a gesture-detectable imaging range, to the new gesture detection camera selected in step S13.

FIGS. 9C-1 and 9C-2 illustrate an example where the gesture detection camera is changed from the camera 100A to the camera 100B, and the imaging range of the camera 100B is changed to an imaging range where the gesture detection for the subject 601 is possible. FIG. 9C-1 illustrates an example where the imaging range of the camera 100B is changed to an imaging range 522a where the whole body of the subject 601 can be captured. FIG. 9C-2 illustrates an example where the imaging range of the camera 100B is changed to an imaging range 522b where both the monitor 602 that has been originally captured by the camera 100B and the whole body of the subject 601 can be captured.

The imaging range after the change to the new gesture detection camera can be determined only for the gesture detection or set by extending the former imaging range. The method of determining the imaging range after the change to the new gesture detection camera is not limited to the method above.

If the gesture detection is performed with the extended imaging range of the camera 100B, a partial image corresponding to the imaging range 521 before the change is clipped from a captured image of the camera 100B and used as a captured image of the camera 100B, as illustrated in FIG. 9C-2.

If the imaging range of the gesture detection camera is changed in step S14, information about the changed imaging range for the gesture detection can be presented in the display screen for captured images or stored in recorded images. As described above, the user is able to recognize that a raw image is highly likely to be an unfavorable image to transmit, to the user, by presenting information showing that the imaging range for the gesture detection has been changed, or by recording the information in captured images.

If the gesture detection apparatus 300 determines that the gesture control end instruction is not received from the user (NO in step S5), the processing proceeds to step S15.

In step S15, the gesture management unit 311 determines whether the gesture control camera and the gesture detection camera are an identical camera. If the gesture management unit 311 determines that the two cameras are an identical camera (YES in step S15), the processing returns to step S12. If the gesture management unit 311 determines that the two cameras are different cameras (NO in step S15), the processing proceeds to step S16.

In step S16, the gesture detectability determination unit 321 determines whether the gesture detection is possible based on captured images of the gesture control camera. If the gesture detectability determination unit 321 determines that the gesture detection is possible (YES in step S16), the processing proceeds to step S17. If the gesture detectability determination unit 321 determines that the gesture detection is not possible (NO in step S16), the processing proceeds to step S19.

For example, if the zoom mode of the camera 100A is changed from the face closeup mode illustrated in FIGS. 9C-1 and 9C-2 to the whole body mode illustrated in FIG. 9A again under the gesture control by the subject 601, the gesture detectability determination unit 321 determines that the gesture detection is possible.

In step S17, if the imaging range of the gesture detection camera is changed to perform the gesture detection in step S14, the gesture detection camera change unit 322 restores the imaging range of the gesture detection camera to the imaging range before the change. The gesture detection camera change unit 322 can issue an instruction for ending the control of the imaging range for the gesture detection to the gesture detection camera.

In step S18, the gesture detection camera change unit 322 registers the information about the gesture detection camera in the gesture management unit 311 to restore the gesture detection camera to the gesture control camera. The processing then returns to step S12.

In step S19, the gesture detectability determination unit 321 determines whether the gesture detection is possible based on captured images of the gesture detection camera. If the gesture detectability determination unit 321 determines that the gesture detection is possible (YES in step S19), the processing returns to step S3. If the gesture detectability determination unit 321 determines that the gesture detection is not possible (NO in step S19), the gesture detectability determination unit 321 determines the necessity of changing the gesture detection camera. The processing then returns to step S13.

Alternatively, if the gesture detectability determination unit 321 determines that gesture detection is not possible (NO in step S19), the gesture detectability determination unit 321 can determine the necessity of changing the imaging range of the gesture detection camera to a gesture-detectable imaging range. The processing then returns to step S14.

Alternatively, in steps S12, S16 or S19, when determining whether the gesture detection is possible based on captured images, the gesture detectability determination unit 321 can determine that the gesture detection is possible or not when a state where the gesture detection is possible or not lasts, respectively, for a predetermined period of time.

The above-described processing flow enables normally performing the gesture control based on captured images of the gesture control camera, and performing the gesture control after changing the gesture detection camera only when the gesture detection is not possible based on captured images of the gesture control camera.

As described above, the gesture detection apparatus 300 according to the present exemplary embodiment determines whether the gesture information for the subject 601 is detectable based on captured images of the gesture control camera. If the gesture detection apparatus 300 determines that the gesture information cannot be detected based on captured images of the gesture control camera, the gesture detection apparatus 300 detects the gesture information for the subject 601 based on captured images of the gesture detection camera different from the gesture control camera. If the gesture detection apparatus 300 determines that the gesture information is detectable based on captured images of the gesture control camera, the gesture detection apparatus 300 detects the gesture information for the subject 601 based on captured images of the gesture control camera.

As described above, the gesture detection apparatus 300 can perform the gesture detection by using captured images of the gesture detection camera different from the gesture control camera, only when the gesture detection apparatus 300 cannot perform the gesture detection based on captured images of the gesture control camera. This enables normally using the same single camera as the gesture control camera and the gesture detection camera, making it possible to suitably detect gestures performed by the subject 601 toward the gesture control camera, based on captured images of the gesture control camera.

In this case, the gesture detection apparatus 300 can determine whether the gesture detection is possible from the captured images of the gesture control camera, based on either the captured images or the imaging state or both the captured images and the imaging state, of the gesture control camera. In this case, the gesture detection apparatus 300 can identify whether the captured images of the gesture control camera include body parts to be used for the gesture detection, and suitably determine whether the gesture detection is possible based on captured images of the gesture control camera.

In the examples illustrated in FIGS. 9A to 9C-2, the imaging system is provided with two different cameras. In a state where the gesture detection is not possible based on captured images of the camera 100A as the gesture control camera, the other camera 100B is selected as the gesture detection camera. However, when the imaging system is provided with two or more cameras in addition to the gesture control camera, either one is selected from among these cameras and decided to be used as the gesture detection camera.

When the gesture detection camera is selected from among a plurality of the cameras, a new gesture detection camera can be selected based on the imaging states of each of the plurality of the cameras. The gesture detection camera can be selected from, for example, an overview camera, a camera capturing a subject 601 performing a gesture, a camera capturing the range closest to the subject 601 performing a gesture, and a camera capturing a range (e.g., subject) having the lowest priority. More specifically, the gesture detection camera is selected as much as possible from a camera that requires no change of the imaging range, a camera with the least change of the imaging range, or a camera having the least effects on the image capturing.

If the gesture detection camera is selected from among the plurality of the cameras, a new gesture detection camera can also be selected based on the transmission state of each camera. For example, it is not desirable to change the imaging range while the image capturing and the transmission of captured images are performed at the same time. Thus, a camera not currently transmitting images can be selected as the gesture detection camera.

If a gesture detection camera is selected from among a plurality of the cameras 100, a new gesture detection camera can also be selected based on the arrangement state of each of the plurality of the cameras 100. For example, assuming that the subject 601 performs a gesture toward the gesture control camera, the camera disposed at the position closest to the gesture control camera can be selected as the gesture detection camera.

The method for selecting the gesture detection camera is not limited thereto.

The above-described method for selecting the gesture detection camera is also applicable to a case where the gesture detection is performed based on captured images of the gesture detection camera always different from the gesture control camera, like the first exemplary embodiment. More specifically, the gesture detection apparatus 300 can decide the gesture detection camera based on at least either one of the imaging states, transmission states, or arrangement (installation) states of the plurality of the cameras 100.

In this case, the gesture detection apparatus 300 can change the imaging range of the decided gesture detection camera to an imaging range where the gesture information for the subject 601 is detectable based on captured images of the gesture detection camera, like the second exemplary embodiment. At this timing, the gesture detection apparatus 300 can present information, to the subject 601, indicating that the imaging range of the gesture detection camera has been changed, or record the relevant information in captured images. The gesture detection apparatus 300 can further present information about the gesture detection camera out of the plurality of the cameras 100, to the subject 601.

The presentation method can be similar to that according to the second exemplary embodiment.

Exemplary embodiments have been described above centering on a case where only one gesture control camera is selected, however, a plurality of gesture control cameras can also be selected. In this case, the gesture information to be detected and the corresponding camera control information can be managed for each of the gesture control cameras, and gesture control can be performed while changing the gesture detection camera according to the imaging state of each gesture control camera.

The present disclosure can also be achieved when a program for implementing at least one of the functions according to the above-described exemplary embodiments is supplied to a system or apparatus via a network or storage medium, and one or more processors of the computer of the system or apparatus reads and executes the program. Further, the present disclosure can also be achieved by a circuit (e.g., an application specific integrated circuit (ASIC)) for implementing one or more functions.

The disclosure of the present exemplary embodiment includes the following configurations and method.

(Configuration 1)

An information processing apparatus including a detection unit configured to detect, based on images captured by a first imaging apparatus, gesture information of a subject, the first imaging apparatus being among a plurality of imaging apparatuses that includes a second imaging apparatus different from the first imaging apparatus, the second imaging apparatus being configured to be controlled based on the gesture performed by the subject, an acquisition unit configured to acquire control information for controlling the second imaging apparatus, the control information being associated with the gesture information detected by the detection unit; and a control unit configured to control the second imaging apparatus based on the control information acquired by the acquisition unit.

(Configuration 2)

The information processing apparatus according to Configuration 1, further including a determination unit configured to determine whether the gesture information of the subject is detectable based on images captured by the second imaging apparatus based on captured images of the second imaging apparatus or an imaging state of the second imaging apparatus or both images captured by the second imaging apparatus and the imaging state of the second imaging apparatus, wherein, in a case where the determination unit determines that the gesture information is not detectable, the detection unit detects the gesture information of the subject based on images captured by the first imaging apparatus, and wherein, in a case where the determination unit determines that the gesture information is detectable, the detection unit detects the gesture information of the subject based on images captured by the second imaging apparatus.

(Configuration 3)

The information processing apparatus according to Configuration 1 or 2, further including a decision unit configured to decide which imaging apparatus among the plurality of imaging apparatuses is the first imaging apparatus based on one or more of imaging states, transmission states, or installation states of respective one of the plurality of imaging apparatuses.

(Configuration 4)

The information processing apparatus according to Configuration 3, wherein, based on the imaging states of respective ones of the plurality of imaging apparatuses, the decision unit decides that, among the plurality of imaging apparatuses, the first imaging apparatus is either an imaging apparatus capturing a range where the subject possibly moves, an imaging apparatus capturing the subject, an imaging apparatus capturing a range closest to the subject, and an imaging apparatus capturing a range with the lowest priority.

(Configuration 5)

The information processing apparatus according to Configuration 3 or 4, wherein, based on the transmission states of the plurality of imaging apparatuses, the decision unit decides that, among the plurality of imaging apparatuses, the first imaging apparatus is an imaging apparatuses not currently transmitting captured images.

(Configuration 6)

The information processing apparatus according to any one of Configurations 3 to 5, wherein, based on the installation states of the plurality of imaging apparatuses, the decision unit decides that, among the plurality of imaging apparatuses, the first imaging apparatus an imaging apparatus installed at a position closest to the second imaging apparatus.

(Configuration 7)

The information processing apparatus according to any one of Configurations 3 to 6, further including a change unit configured to change an imaging range of the first imaging apparatus to an imaging range where the gesture information of the subject is detectable based on captured images of the first imaging apparatus.

(Configuration 8)

The information processing apparatus according to Configuration 7, wherein the change unit presents, to a user, information indicating that the imaging range of the first imaging apparatus base been changed or records information indicating that the imaging range of the first imaging apparatus base been changed in the captured images.

(Configuration 9)

The information processing apparatus according to any one of Configurations 1 to 8, further including a management unit configured to manage correspondence information configured to associate the gesture information of the subject with the control information, wherein the acquisition unit refers to the managed correspondence information to acquire the control information associated with the detected gesture information.

(Configuration 10)

The information processing apparatus according to Configuration 9, wherein the management unit manages the correspondence information configured to associate the gesture information to be detected predetermined according to an imaging state of the second imaging apparatus with the control information.

(Configuration 11)

The information processing apparatus according to any one of Configurations 1 to 10, further including a presentation unit configured to present, to the subject, information indicating an imaging apparatus, from among the plurality of the imaging apparatuses, currently capturing images is being used for detecting gesture information by the detection unit.

(Method 1)

An information processing method including detecting, based on images captured by a first imaging apparatus, gesture information of a subject, the first imaging apparatus being among a plurality of imaging apparatuses that includes a second imaging apparatus different from the first imaging apparatus, the second imaging apparatus being configured to be controlled based on the gesture performed by the subject, acquiring control information for controlling the second imaging apparatus, the control information being associated with the detected gesture information, and controlling the second imaging apparatus based on the acquired control information.

The above-described exemplary embodiments enable imaging apparatuses to suitably perform control in response to a gesture of a subject regardless of imaging states of the imaging apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-069848, filed Apr. 21, 2022, which is hereby incorporated by reference herein in its entirety.

What is claimed is:

1. A control apparatus comprising:
   at least one memory storing instructions; and
   at least one processor that, upon execution of the instructions, is configured to operate as:
   a detection unit configured to detect, based on images captured by a first imaging apparatus, a gesture performed by a subject, the first imaging apparatus being among a plurality of imaging apparatuses that includes a second imaging apparatus different from the first imaging apparatus, the second imaging apparatus being configured to be controlled based on the gesture performed by the subject;
   an acquisition unit configured to acquire control information for controlling the second imaging apparatus, the control information being associated with the gesture detected by the detection unit;
   a control unit configured to control the second imaging apparatus based on the control information acquired by the acquisition unit; and
   a determination unit configured to determine whether the gesture performed by the subject is detectable based on images captured by the second imaging apparatus based on either images of the second imaging apparatus or an imaging state of the second imaging apparatus or both images captured by the second imaging apparatus and the imaging state of the second imaging apparatus,
   wherein, in a case where the determination unit determines that the gesture is not detectable, the detection unit detects the gesture performed by the subject based on images captured by the first imaging apparatus, and
   wherein, in a case where the determination unit determines that the gesture is detectable, the detection unit detects the gesture performed by the subject based on images captured by the second imaging apparatus.

2. The information processing apparatus according to claim 1, wherein execution of the stored instructions further configures the at least one processor to operate as a decision unit configured to decide which imaging apparatus among the plurality of imaging apparatuses is the first imaging apparatus based on one or more of imaging states, transmission states, or installation states of respective one of the plurality of imaging apparatuses.

3. The information processing apparatus according to claim 2, wherein, based on the imaging states of respective ones of the plurality of imaging apparatuses, the decision unit decides that, among the plurality of imaging apparatuses, the first imaging apparatus is either an imaging apparatus capturing a range where the subject possibly moves, an imaging apparatus capturing the subject, an imaging apparatus capturing a range closest to the subject, and an imaging apparatus capturing a range with the lowest priority.

4. The information processing apparatus according to claim 2, wherein, based on the transmission states of the plurality of imaging apparatuses, the decision unit decides that, among the plurality of imaging apparatuses, the first imaging apparatus is an imaging apparatuses not currently transmitting captured images.

5. The information processing apparatus according to claim 2, wherein, based on the installation states of the plurality of imaging apparatuses, the decision unit decides that, among the plurality of imaging apparatuses, the first imaging apparatus an imaging apparatus installed at a position closest to the second imaging apparatus.

6. The information processing apparatus according to claim 2, wherein execution of the stored instructions further configures the at least one processor to operate as a change unit configured to change an imaging range of the first imaging apparatus to an imaging range where the gesture performed by the subject is detectable based on captured images of the first imaging apparatus.

7. The information processing apparatus according to claim 6, wherein the change unit presents, to a user, information indicating that the imaging range of the first imaging apparatus has been changed or records information indicating that the imaging range of the first imaging apparatus has been changed in the captured images.

8. The information processing apparatus according to claim 1, wherein execution of the stored instructions further configures the at least one processor to operate as a management unit configured to manage correspondence information configured to associate the gesture performed by the subject with the control information, wherein the acquisition unit refers to the managed correspondence information to acquire the control information associated with the detected gesture.

9. The information processing apparatus according to claim 8, wherein the management unit manages the correspondence information configured to associate the gesture to be detected predetermined according to an imaging state of the second imaging apparatus with the control information.

10. The information processing apparatus according to claim 1, wherein execution of the stored instructions further configures the at least one processor to operate as a presentation unit configured to present, to the subject, information indicating an imaging apparatus, from among the plurality of the imaging apparatuses, currently capturing images is being used for detecting gestures by the detection unit.

11. An information processing method comprising:
    detecting, based on images captured by a first imaging apparatus, a gesture performed by a subject, the first imaging apparatus being among a plurality of imaging apparatuses that includes a second imaging apparatus different from the first imaging apparatus, the second imaging apparatus being configured to be controlled based on the gesture performed by the subject;
    acquiring control information for controlling the second imaging apparatus, the control information being associated with the gesture detected;
    controlling the second imaging apparatus based on the acquired control information; and
    determining whether the gesture performed by the subject is detectable based on images captured by the second imaging apparatus based on either images of the second imaging apparatus or an imaging state of the second imaging apparatus or both images captured by the second imaging apparatus and the imaging state of the second imaging apparatus,
    wherein, in a case where it is determined that the gesture is not detectable, the gesture performed by the subject is detected based on images captured by the first imaging apparatus, and
    wherein, in a case where it is determined that the gesture is detectable, the gesture performed by the subject is detected based on images captured by the second imaging apparatus.

12. A non-transitory computer-readable storage medium which stores a program for executing an information processing method, the method comprising:
    detecting, based on images captured by a first imaging apparatus, a gesture performed by a subject, the first imaging apparatus being among a plurality of imaging apparatuses that includes a second imaging apparatus different from the first imaging apparatus, the second imaging apparatus being configured to be controlled based on the gesture performed by the subject;
    acquiring control information for controlling the second imaging apparatus, the control information being associated with the gesture detected;
    controlling the second imaging apparatus based on the acquired control information; and
    determining whether the gesture performed by the subject is detectable based on images captured by the second imaging apparatus based on either images of the second imaging apparatus or an imaging state of the second imaging apparatus or both images captured by the second imaging apparatus and the imaging state of the second imaging apparatus,
    wherein, in a case where it is determined that the gesture is not detectable, the gesture performed by the subject is detected based on images captured by the first imaging apparatus, and
    wherein, in a case where it is determined that the gesture is detectable, the gesture performed by the subject is detected based on images captured by the second imaging apparatus.

* * * * *